(12) United States Patent
Cargnelli et al.

(10) Patent No.: US 6,619,054 B1
(45) Date of Patent: Sep. 16, 2003

(54) CONDENSER FOR DEHUMIDIFYING GAS

(75) Inventors: Joseph Cargnelli, Toronto (CA); Ravi B. Gopal, Oakville (CA); Jianming Ye, Woodbridge (CA)

(73) Assignee: Hydrogenics Corporation, Mississauga (CA)

(*) Notice: Subject to any disclaimer, the term of this patent is extended or adjusted under 35 U.S.C. 154(b) by 0 days.

(21) Appl. No.: 10/138,335

(22) Filed: May 6, 2002

(51) Int. Cl.[7] ............................................. F25D 17/06
(52) U.S. Cl. ............................................. 62/93; 62/317
(58) Field of Search .......................... 62/93, 515, 516, 62/317, 272; 165/111, 142

(56) References Cited

U.S. PATENT DOCUMENTS

| | | | | |
|---|---|---|---|---|
| 2,503,595 A | * | 4/1950 | Preston | 257/246 |
| 2,970,669 A | * | 2/1961 | Bergson | |
| 3,837,396 A | * | 9/1974 | Newton | 165/111 |
| 4,561,498 A | * | 12/1985 | Nowobilski et al. | 165/160 |
| 4,612,086 A | | 9/1986 | Dominguez | |
| 4,850,426 A | * | 7/1989 | Fayolle et al. | 165/111 |
| 4,883,117 A | * | 11/1989 | Dobbs et al. | 165/165 |
| 4,895,203 A | | 1/1990 | McLaren | |
| 5,004,046 A | | 4/1991 | Jones | |
| 5,634,517 A | | 6/1997 | Linden | |
| 5,983,841 A | | 11/1999 | Haber | |
| 6,293,335 B1 | | 9/2001 | Tawney | |

* cited by examiner

*Primary Examiner*—Melvin Jones
(74) *Attorney, Agent, or Firm*—Bereskin & Parr

(57) ABSTRACT

A condenser, for cooling a gas flow containing a vapor to promote condensation of the vapor, has a generally cylindrical chamber. Gas is admitted at one end of the chamber and is given a swirl component of velocity. The gas then travels axially along the length of the chamber, and passes radially through poles into the bore of a separator. The swirl velocity of the gas flow tends to through water droplets radially outwards, where they can drain down the inside of a casing defining the chamber. The separator can include a skirt portion separating the main chamber from a water collection compartment. Cooling to cause condensation is provided by an external jacket, preferably having a coolant flowing through it in a helical fashion.

26 Claims, 9 Drawing Sheets

CONDENSER FOR DEHUMIDIFYING GAS

FIELD OF THE INVENTION

The present invention generally relates to a condenser. More particularly, the present invention relates to a condenser for dehumidifying gases.

BACKGROUND OF THE INVENTION

There are a variety of devices used to condense water out of a gas stream in domestic and industrial applications. Examples of known condenser devices include tube and shell heat exchangers, plate type heat exchangers, etc.

One commonly known type of condenser employs bundles of tubes located inside an enclosure. Typically, the enclosure generally has a hollow cylindrical body with a gas inlet and a gas outlet. Gas containing high humidity flows through the chamber of the enclosure and comes into contact with the tube surfaces. Coolant runs through the tubes while moist gas flows over the outer surfaces of the tubes to exchange heat indirectly with the coolant. Water condenses out of the moist gas onto the surface of tubes. The coolant and gas may either flow in substantially same direction, known as "parallel flow", or in opposite direction, known as "counter flow".

There are variations of these condensers. In some of them, the bundles of tubes are arranged vertically while in others, the tubes are horizontal. In order to enlarge the heat exchange area, the tubes may be in a bent form (U-shape or serpentine shape). The tubes may also take coil or helical shapes. However, in order to increase the flow path and contact area between the gas and the coolant the device has to be large. The efficiency of heat exchange between the surface and the gas depends on the flow rate of gas and coolant. In order to achieve better heat exchange results, the flow rate has to be sufficiently large, which may impact or require ancillary equipment, such as a pump, a compressor, etc. This significantly reduces the system efficiency. Hence, all these variants tend to be bulky and suffer from low heat exchange efficiency.

Therefore, there remains a need for a compact, efficient condenser which is operable with relatively low flow rate of coolant and gas to be dehumidified.

SUMMARY OF THE INVENTION

In accordance with the present invention, there is provided a condenser, for cooling vapor contained in a gas flow, the condenser comprising:
a chamber having a generally circular cross-section about an axis thereof and adapted to be mounted with the axis substantially vertical;
a gas inlet opening into one end of the chamber, for supply of gas to one end of the chamber, and a gas outlet opening into the chamber, for discharge of gas from the chamber;
means for imparting a swirl component of velocity to the gas flow supplied to the chamber through the gas inlet and mounted adjacent said one end of the chamber, the arrangement being such that gas flows from one end of the chamber to the other end thereof;
means for cooling the chamber to thereby remove heat therefrom to promote condensation of the vapor; and
wherein the means from imparting a swirl component of velocity to the gas flow comprises at least one of an arc-shaped gas compartment adjacent the gas inlet and a deflector vane.

In accordance with a further aspect of the present invention, there is provided, a condenser for cooling vapor contained in a gas flow, the condenser comprising:
a chamber having a generally circular cross-section about an axis thereof and adapted to be mounted with the axis substantially vertical;
a gas inlet opening into one, upper end of the chamber, for supply of gas to one end of the chamber, and a gas outlet opening into the chamber, for discharge of gas from the chamber;
means for imparting a swirl component of velocity to the gas flow supplied to the chamber through the gas inlet and mounted adjacent said one end of the chamber, the arrangement being such that gas flows from one end of the chamber to the other end thereof; and
means for cooling the chamber to thereby remove heat therefrom to promote condensation of the vapor;
wherein the chamber provides for unobstructed downward movement of condensate towards the lower end thereof.

Another aspect of the present invention provides a method of cooling a gas flow containing a vapor, to promote condensation of the vapor, the method comprising the steps of:
supplying gas containing moisture to a chamber having a generally circular cross-section, applying a swirl component of velocity to the gas flow and causing the gas to flow axially from one end of the chamber to the other with a helical path including the swirl component of flow;
cooling the chamber to withdraw heat from the gas and promote condensation of the vapor;
mounting the chamber substantially vertically, whereby condensed vapor runs vertically down the inside of the chamber;
withdrawing gas, depleted in the vapor, along the axis of the chamber.

The present invention provides a compact and effective condenser. The design of arc shaped chamber, deflector vane increases the disturbance of gas flow and hence increases the heat exchange efficiency. The helical flow path of coolant further provides sufficient heat exchange between the gas and the coolant resulting in high efficiency of water separation from the gas.

BRIEF DESCRIPTION OF THE DRAWINGS

For a better understanding of the present invention, and to show more clearly how it may be carried into effect, reference will now be made to the accompanying drawings, which show, by way of example, preferred embodiments of the present invention.

DETAILED DESCRIPTION OF THE INVENTION

The features and advantages of the present invention will become more apparent in light of the following detailed description of preferred embodiments thereof.

FIGS. 1 to 4 show the condenser 10 of the present invention. Hereinafter, the present invention will be described by way of its application in dehumidifying air using water as coolant. It should be appreciated, however, that the present invention may also be employed to dehumidify other gases or fluids and to exchange heat, and that coolants other than water can be used.

Figure 1:
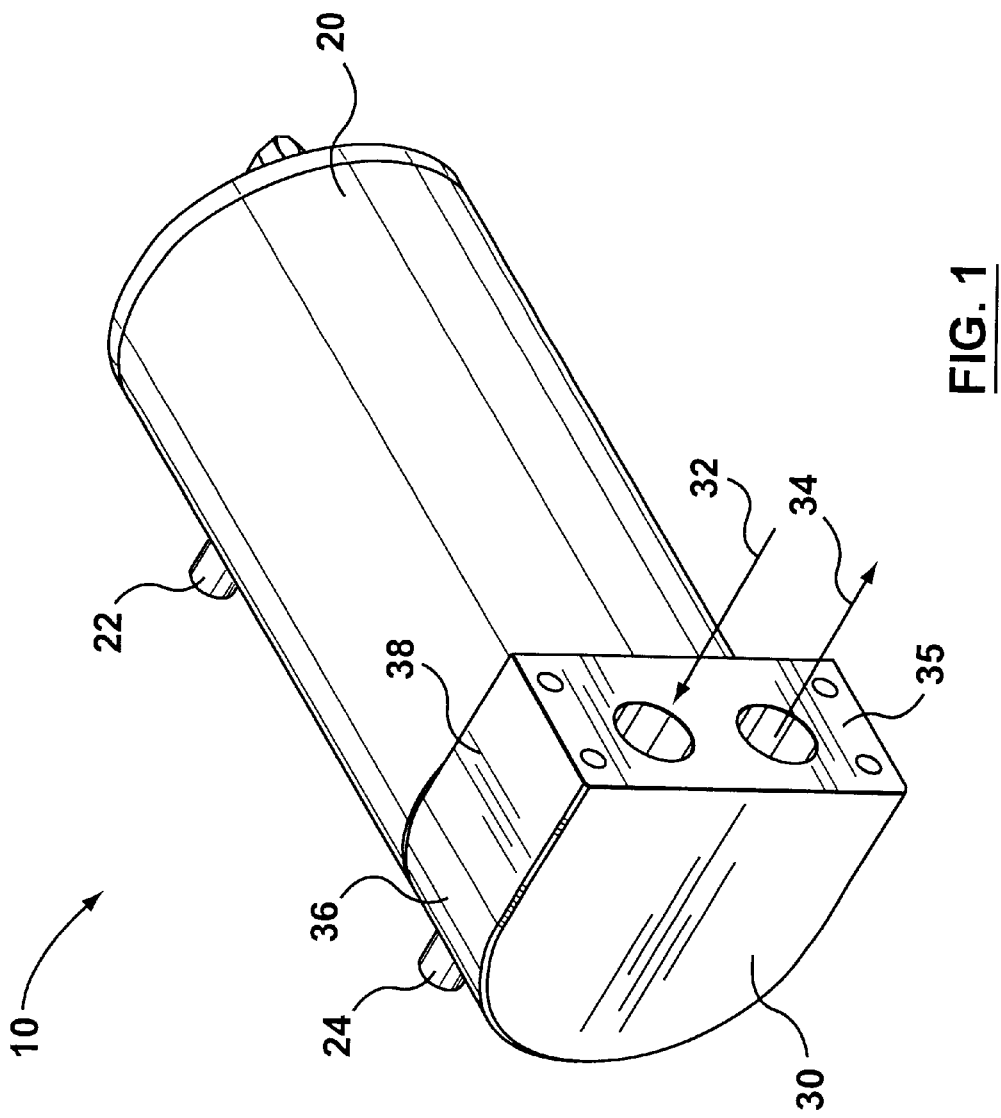
FIG. 1 is a perspective view illustrating a condenser in accordance with the present invention.
Figure 2:
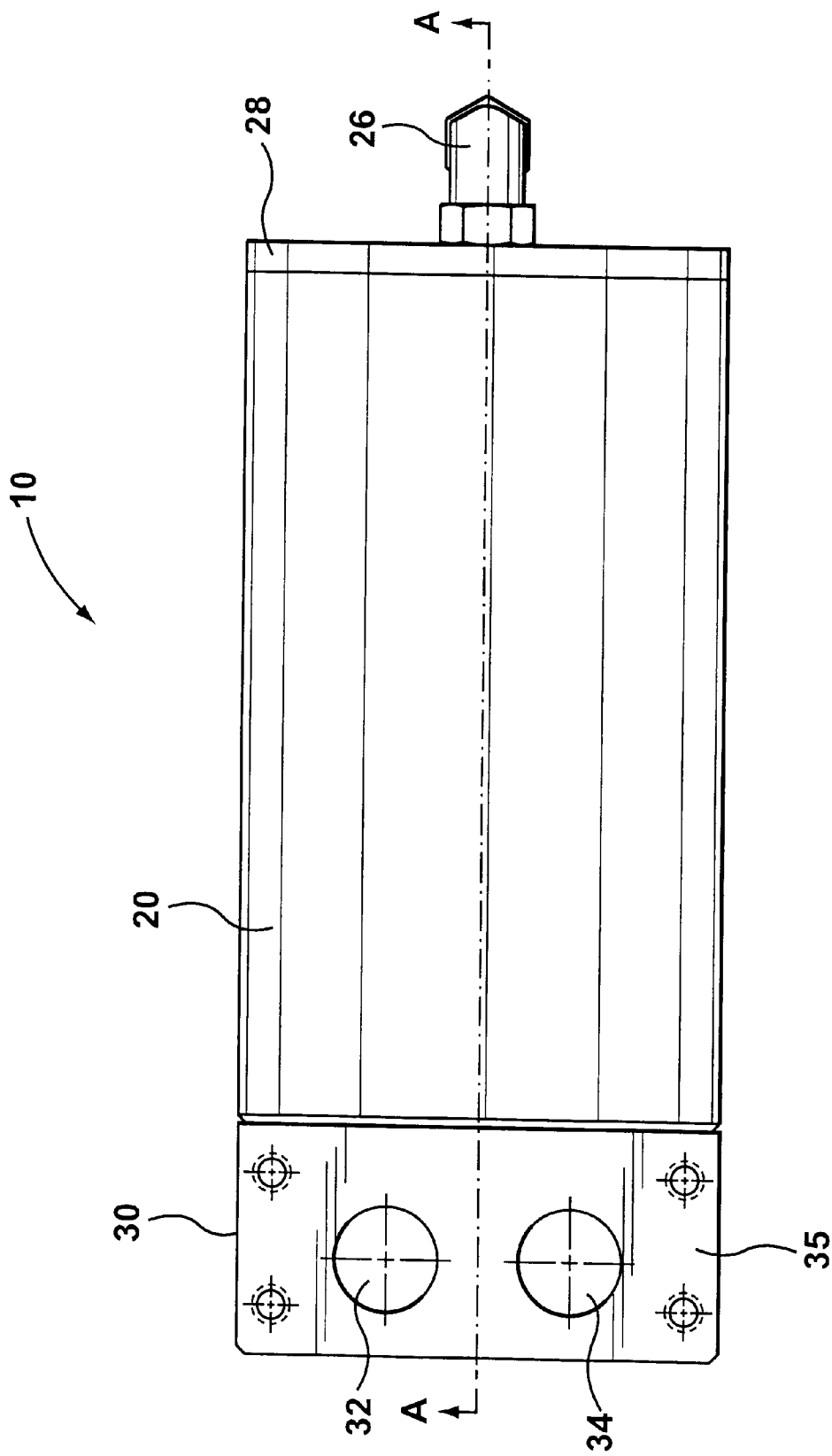
FIG. 2 is an elevation view illustrating the condenser in accordance with the present invention.

The condenser 10 of the present invention generally consists of a casing 20 and a head portion 30. In operation, the condenser 10 is placed in substantially vertical position with the head portion 30 on top of the casing 20. As shown in FIG. 1, the casing 20 of the condenser 10 is generally cylindrical in shape and comprises (with reference to FIGS. 3 and 4) an outer casing 80 and an inner casing 90, which defines a chamber 40. The inner casing 90 and the outer casing 80 is disposed in coaxial relation and defines an annular space 100 therebetween. The inner casing 90 and the outer casing 80 are welded together at the top ends and bottom ends thereof. The outer casing 80 is provided with a coolant inlet 22 and a coolant outlet 24 located perpendicular to the axis of the casing 20. The coolant inlet 22 is located adjacent to the bottom of the casing 20 while the coolant outlet 24 is located adjacent to the head portion 30. The bottom end of the casing 20 is closed by a cap 28. A water discharge port 26 is provided on the cap 28 to discharge the water condensed from the gas out of the chamber 40 thereof.

Figure 10:
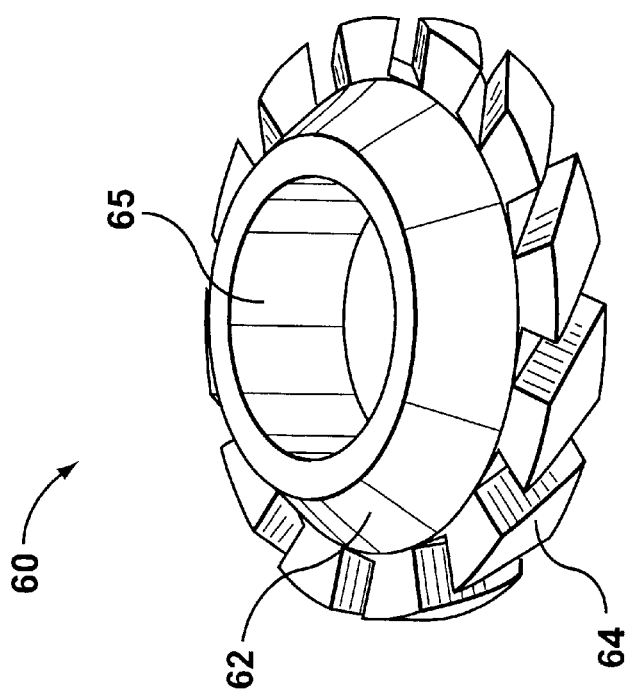
FIG. 10 is a perspective view of a deflector vane of the condenser in accordance with the present invention.
Figure 11:
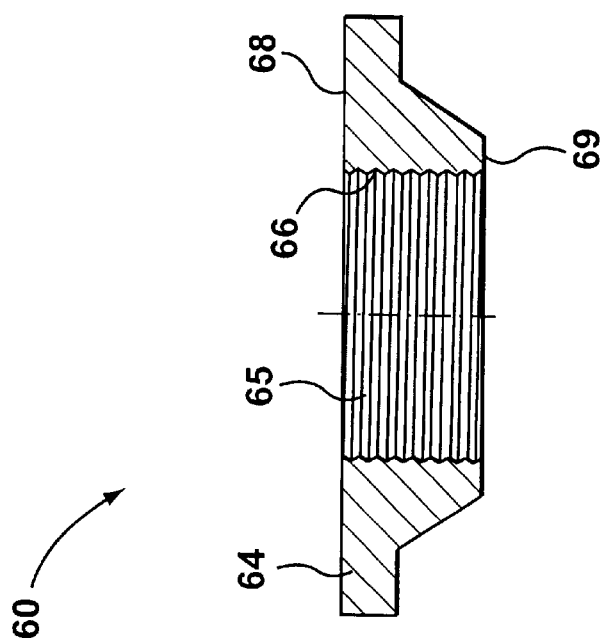
FIG. 11 is a sectional view of the deflector vane of the condenser in accordance with the present invention.

The head portion 30 of the condenser 10 comprises a semicircular portion 36 and a transversely extending portion 38. A gas inlet 32 and a gas outlet 34 are provided on an end wall 35 of the transversely extending portion 38. A separator 50 (FIGS. 8 and 9) and a deflector vane 60 (FIGS. 10 and 11) are disposed inside the chamber 40 of the casing 20. The deflector vane 60 facilitates the distribution of the gas into the chamber 40 in a desired flow pattern. The separator 50 permits the dehumidified gas to flow out of the chamber 40 and separates the gas from condensed water. The assembly of the casing 20, head portion 30, the separator 50 and the deflector vane 60 will be described in more detail below.

Figure 5:
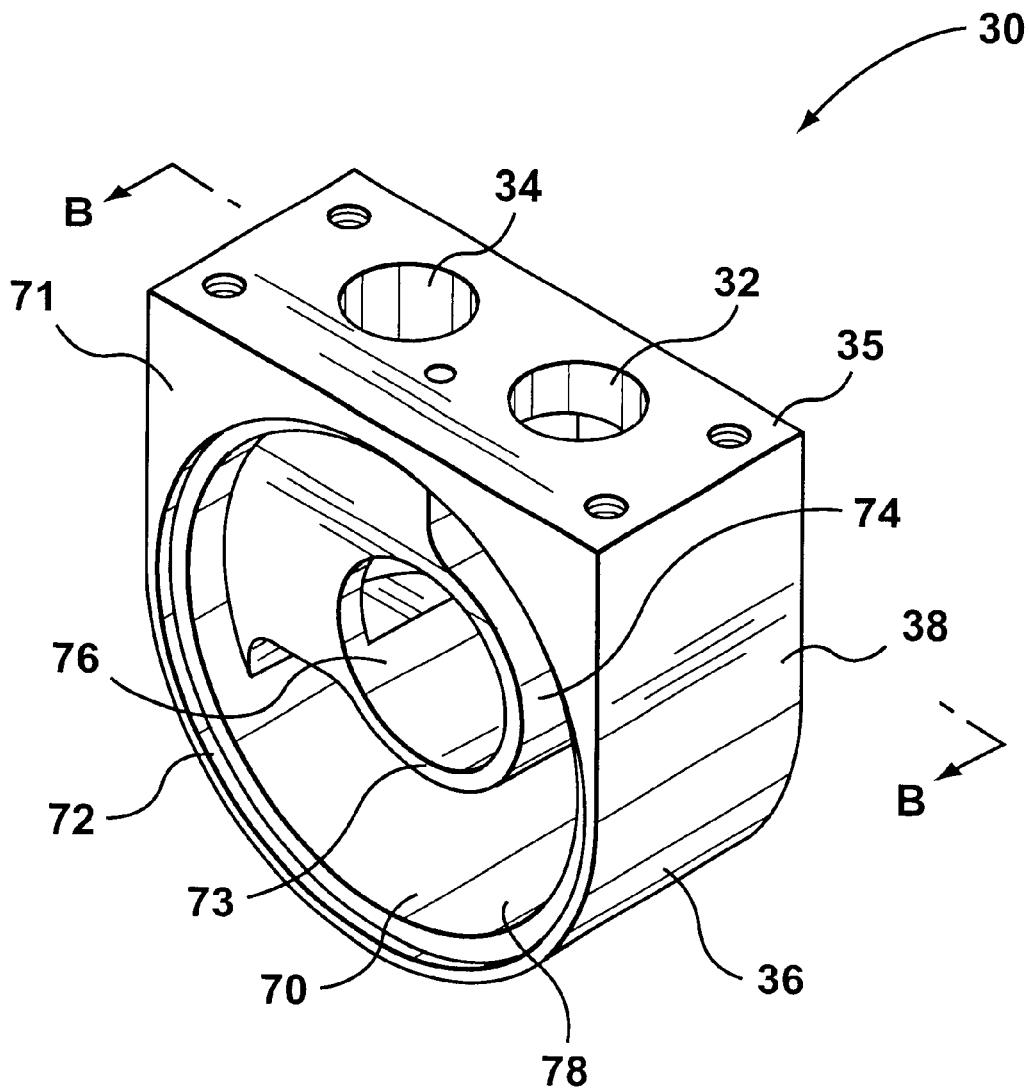
FIG. 5 is a perspective view illustrating a head portion of the condenser in accordance with the present invention.
Figure 7:
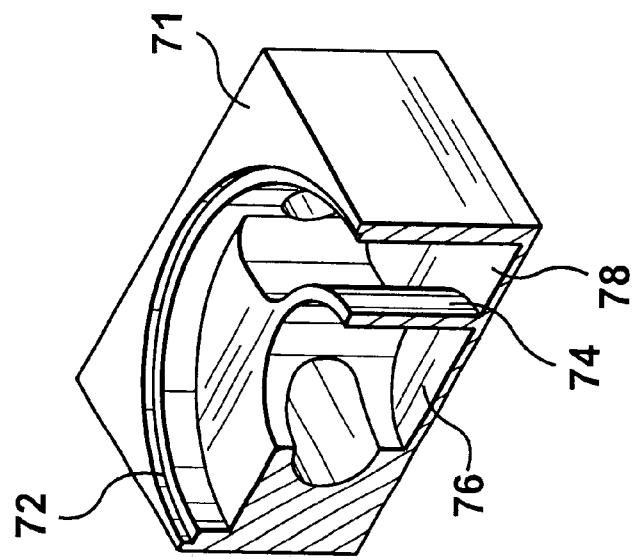
FIG. 7 is a perspective section view illustrating the head portion of the condenser in accordance with the present invention along line C—C in FIG. 6.
Figure 6:
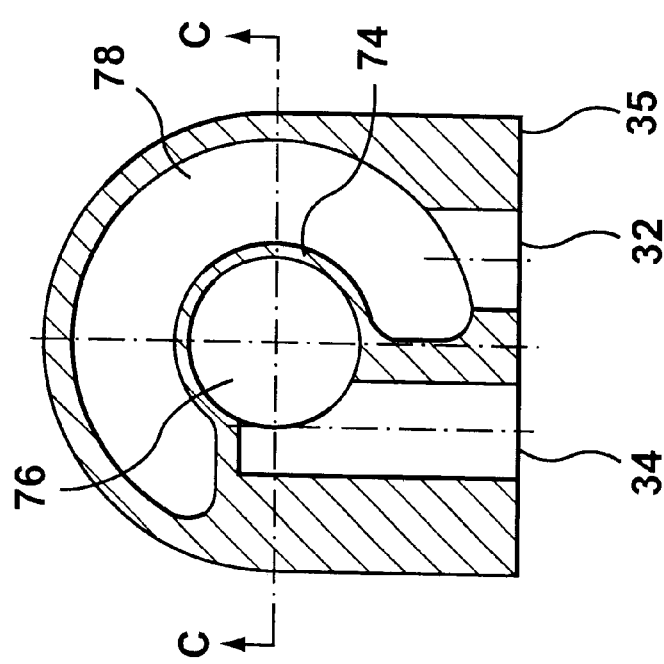
FIG. 6 is a plan section view illustrating the head portion of the condenser in accordance with the present invention along line B—B in FIG. 5.

Now, reference will be made to FIGS. 5 to 7, which show the head portion 30 of the condenser 10. The head portion 30 has a circular open end 70 at the bottom face 71 thereof. A rim 72 is provided around the edge of the circular open end 70. The center of the open end is provided with a bore 76 which is in fluid communication with the gas outlet 34. The side wall 74 of the bore 76 separates the bore 76 from the rest of the open end 70, forming an arc shaped compartment 78. The end face 73 of the bore 76 and side wall 74 are recessed from the bottom face 71 of the head portion 30. The arc shaped compartment 78 is in fluid communication with the gas inlet 32. As can be best seen in FIG. 4, a female thread 77 is provided adjacent the bottom end of the bore 76 for connection with the separator 50.

Figure 9:
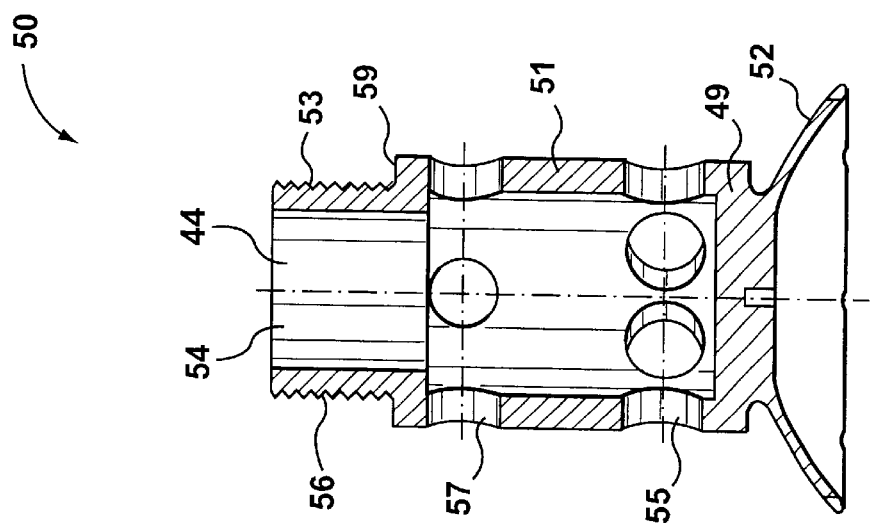
FIG. 9 is a longitudinal sectional view of the deflector of the condenser in accordance with the present invention.
Figure 8:
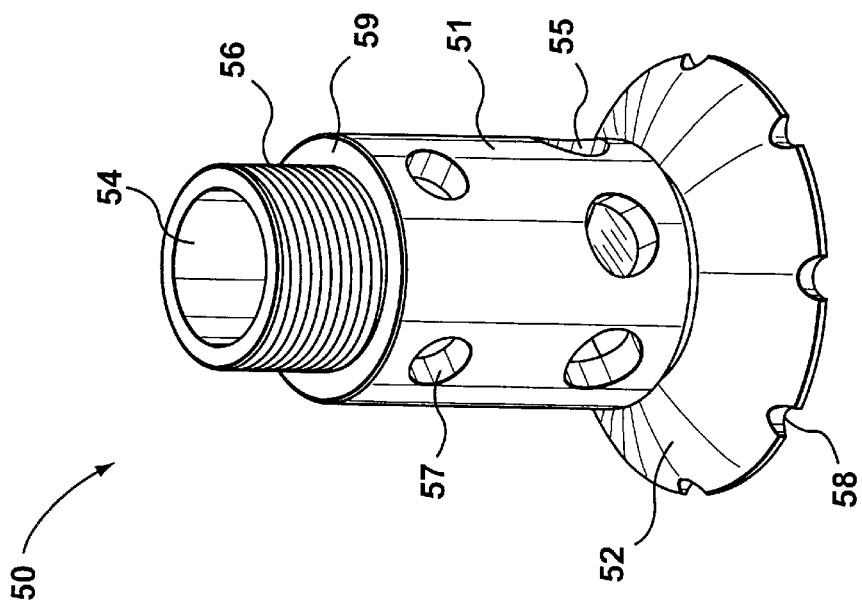
FIG. 8 is a perspective of a deflector of the condenser in accordance with the present invention.

FIGS. 8 and 9 illustrate the separator 50 of the condenser 10. The separator 50 is generally cylindrical in shape with a skirt portion 52 at the bottom end thereof. The separator 50 has a central portion 51 and a reduced diameter portion 56 at the top end thereof. The reduced diameter portion 56 forms a step 59 with the central portion 51. A male thread 53 is provided on the outer wall of the reduced diameter portion 56. The upper end of the male thread 53 is used for connection to the female thread 77 in the bore 76 of the head portion 30, and hence mounting the separator 50 onto the head portion 30. The rest of the male thread 53 is used for connection to the deflector vane 60.

The separator 50 has a bore 54 extending axially from the top end of the reduced diameter portion 56 to the bottom wall 49 of the central portion 51. In this particular embodiment, the bore 54 has a reduced diameter portion 44 axially extending from the top end of the reduced diameter portion 56 to an axial position substantially corresponding to the step 59. However, it is to be understood that the bore 54 does not necessarily have such a reduced diameter portion 44.

A plurality of through holes extending traverse to the axis of the separator 50 are provided on the side wall of the central portion 51 of the separator 50. In this example, six through holes 55 are provided evenly around the side wall of the central portion 51 in an axial position adjacent to the bottom end of the central portion 51. In addition, four through holes 57 are provided evenly around the side wall of the central portion 51 in an axial position adjacent to the top end of the central portion 51. The through holes fluidly communicate the bore 54 and the space outside the side wall of the separator 50.

A skirt portion 52 extends radially outwardly and downwardly from the bottom wall 49 of the central portion 51. The diameter of the skirt portion 52 is slightly smaller than the inner diameter of the inner casing 90 to allow water to flow between them. The skirt portion 52 inclines downwardly to facilitate the flow of the condensed water. A plurality of notches 58 are provided around the edge of the skirt portion 52 to further facilitate the drip down of the condensed water into a water collection compartment 53 defined between the skirt portion 52 and the cap 28. Thus, the inner casing 90 encloses both the main chamber 40 and the water collection compartment 53.

Figure 3:
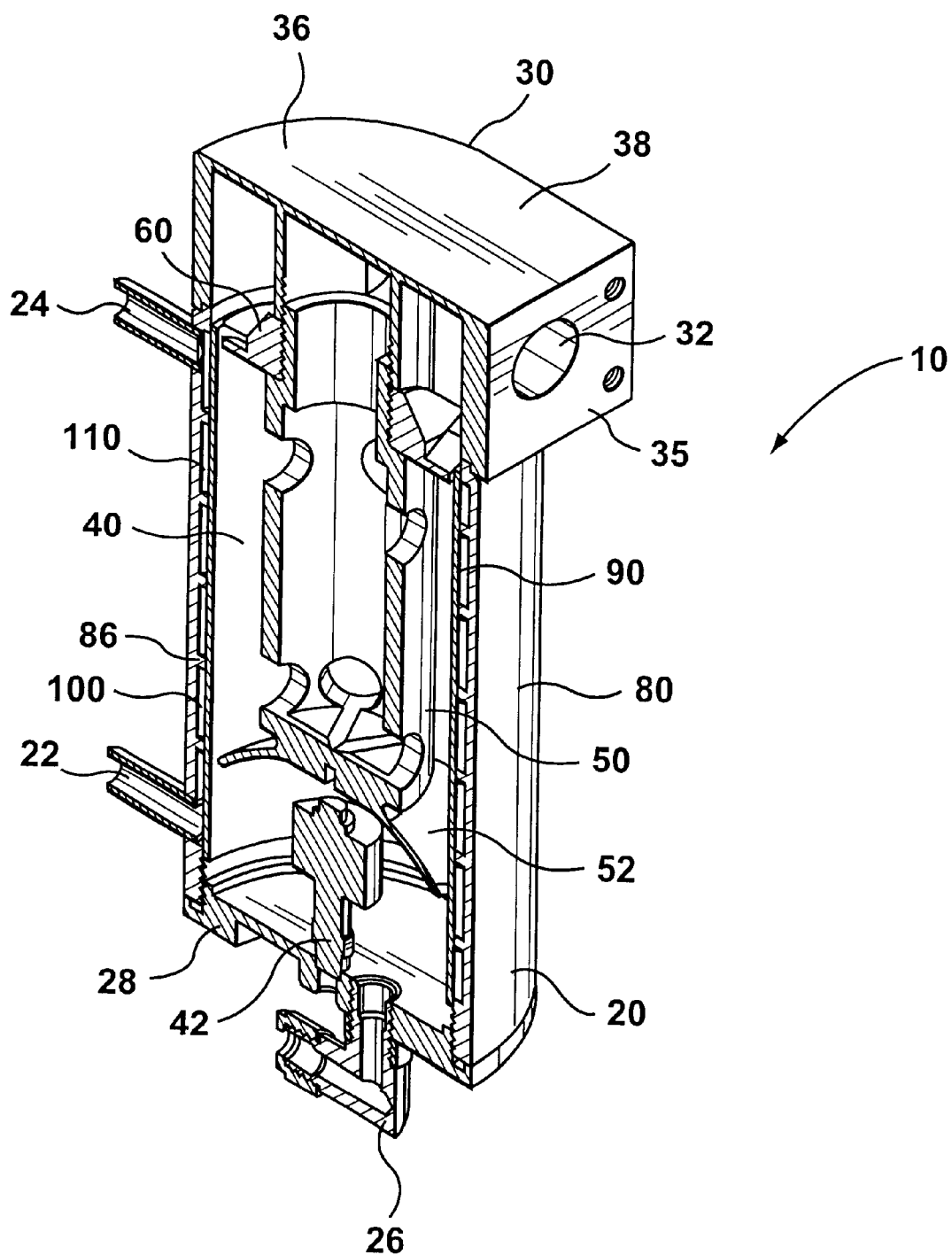
FIG. 3 is a perspective sectional view illustrating the condenser in accordance with the present invention along line A—A in FIG. 2.
Figure 4:
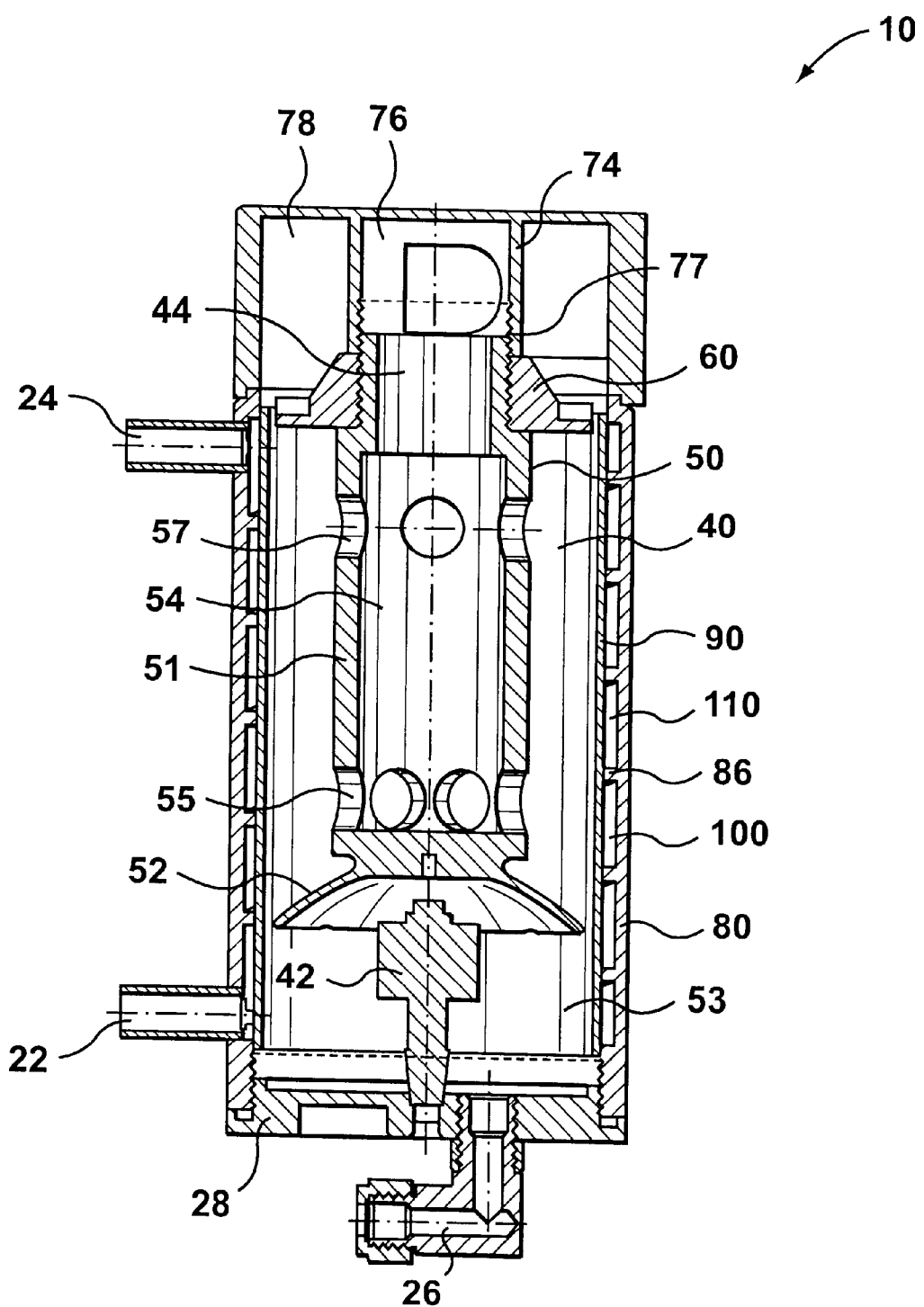
FIG. 4 is an elevational and sectional view illustrating the condenser in accordance with the present invention along line A—A in FIG. 2.

As shown in FIGS. 3 and 4, a deflector vane 60 is mounted around the reduced diameter portion 56 of the separator 50. The deflector vane 60 is shown more clearly in FIGS. 10 and 11. The deflector vane 60 has a truncated conical shaped portion 62. A plurality of vanes 64 are provided around the larger end of the truncated conical shaped portion 62. The vanes 64 are arranged such that helically inclined gaps are formed between adjacent vanes 64. The gaps are inclined along substantially same helical direction. The outer diameter of the vanes 64 is slightly smaller than the inner diameter of the inner casing 90 to allow flow through of gas and easy assembly. The deflector vane 60 has a bore 65 in the center thereof. The bore 65 extends axially throughout the length of the deflector vane 60 and has a female thread 66. The female thread 66 connects the deflector vane 60 to the separator 50 in cooperation with the male thread 53 on the reduced diameter portion 56 of the separator 50. When the deflector vane 60 is mounted onto the separator 50, the bottom face 68 of the deflector vane 60 abuts against the step 59 of the separator 50 and the top face 69 abuts against the bottom face 73 of the side wall 74 on the head portion 30, as can be seen in FIGS. 3 and 4. Thus, the chamber 40 largely comprises an unobstructed annular spaced between the deflector vane 60, the inner casing 90, the separator 50 and the skirt portion 52, through which the gas flows without being subject to any other elements affecting gas velocity or direction.

Figure 13:
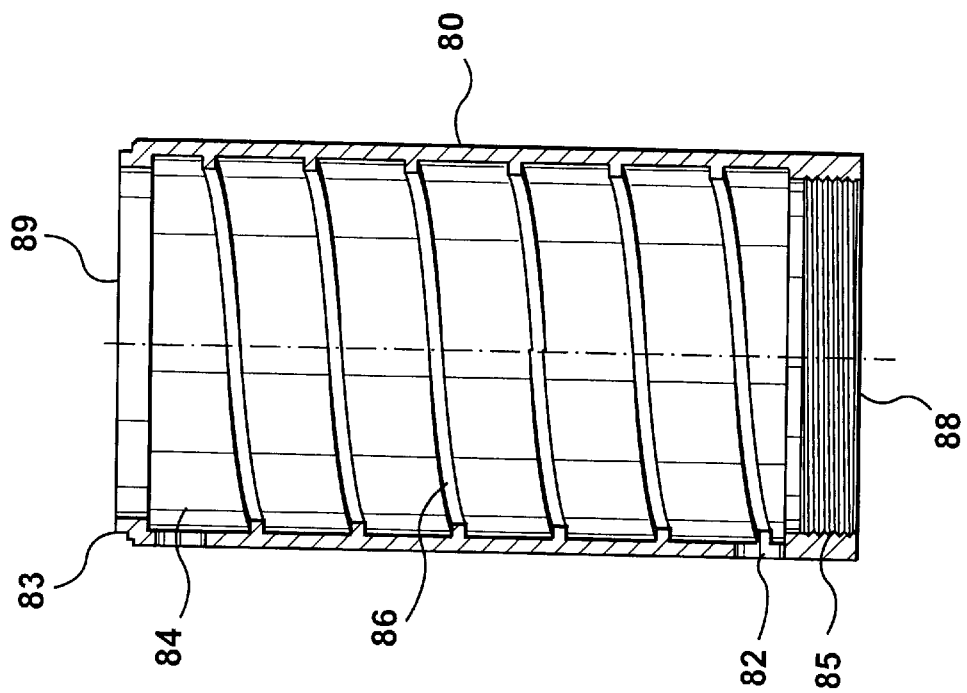
FIG. 13 is a longitudinal sectional view of the outer casing of the condenser in accordance with the present invention.
Figure 12:
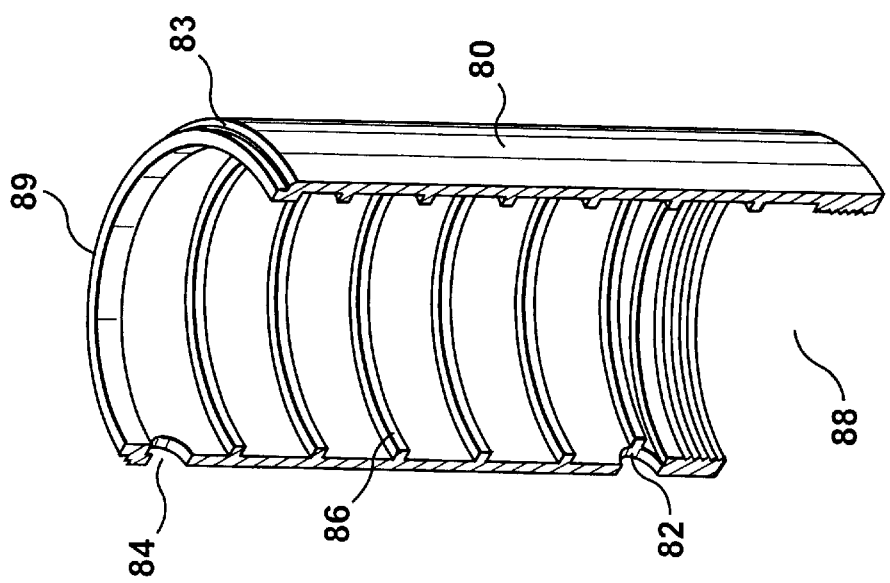
FIG. 12 is a perspective sectional view of an outer casing of the condenser in accordance with the present invention.

Now, reference will be made to FIGS. 12 and 13, which show the outer casing 80 of the condenser 10. The outer case 80 is generally cylindrical in shape with two open ends 88 and 89. On the side wall, a coolant inlet port 82 is provided adjacent the bottom end of the outer casing 80 and a coolant outlet port 84 is provided adjacent the top end thereof. The top edge of the outer casing 80 is provided with a reduced diameter portion 83 so that the reduced diameter portion 83 fits into the rim 72 of the head portion 30 in assembly. During assembly, the rim 72 and the reduced diameter portion 83 jointed are welded together to prevent any leakage of gas to be dehumidified between the head portion 30 and the casing 20.

A rib 86 is provided on the inner wall of the outer casing 80. The rib 86 starts from the coolant inlet port 82, runs helically upwardly around the inner wall of the outer casing 80 and ends at a position adjacent to the top end of the outer casing 80. The helical rib 86 protrudes from the inner wall of the outer casing 80 such that when the inner casing 90 and outer casing 80 are welded together, the rib 86 substantially abuts against the outer wall of the inner casing 90, thereby separating the annular space 100 between the inner casing 90 and the outer casing 80 into one continuous helical channel 110, as shown in FIGS. 3 and 4. The bottom end 88 of the outer casing 80 is provided with a female thread 85 for connection with a cap 28. It can be seen from FIGS. 3 and 4 that the inner casing 90 is generally cylindrical in shape. It is to be understood that the inclination and pitch of the helical rib 86, and hence that of the helical channel 110 may vary as desired, and there can be more than one helical channel.

Stilling referring to FIGS. 3 and 4, the cap 28 closes the bottom end of the casing 20 through thread connection. Therefore, the chamber 40 is defined therein. A water level detector 42 can be mounted on the cap 28 to monitor the level of the condensed water in the water collection compartment 53. When the condensed water reaches a certain level, the water discharge port 26 is opened to discharge water out of the chamber 40. This can be done manually or automatically.

In operation, gas to be dehumidified flows into the condenser 10 through the gas inlet 32. From the gas inlet 32, the gas flows through the arc shaped chamber 78. The disturbance or turbulence of the gas flow increases as the direction of gas flow changes. In addition, since the vane 64 of the deflector vane 60 substantially closes the circular open end 70 of the head portion 30 except for a plurality of gaps between adjacent vanes 64, the gas flows into the chamber 40 through said plurality of helically inclined gaps. Therefore, a vortex is formed in the gas flowing into the chamber 40, i.e. a substantial swirl component of velocity is imparted to the gas flow. The gas flows downwardly in a swirling pattern in the chamber 40 around the separator 50.

Simultaneously, a coolant, usually water, is supplied from the coolant inlet 22 near the bottom of the casing 20. From the coolant inlet 22, the coolant flows into the annular space 100 between the inner casing 90 and the outer casing 80. From here, coolant flows upwardly along the helical channel 110 and flows out of the annular space 100 from the coolant outlet 24 adjacent the top end of the casing 20, i.e. the coolant flow is countercurrent in the axial direction.

In the chamber 40, the gas is cooled on the surface of the inner casing 90 and hence water is condensed. The dehumidified gas then flows through the plurality of through holes 55 and 57 into the bore 54 of the separator 50. From here, the gas flows along the channel formed by the bore 54 of the separator 50, and the bore 76 of the head portion 30. Then the dehumidified gas flows out of the condenser 10 through the gas outlet 34. The swirling flow of the gas and the helical flow path of coolant provide sufficient heat exchange between the gas and the coolant, resulting in high efficiency of water separation from the gas. The swirling flow also promotes separation of water droplets from the gas flow, and should prevent water droplets being entrained in the radially inward flow of gas into the through holes 55, 57.

Condensed water flows down along the inner wall of the inner casing 90 and the skirt portion 52 of the separator 50, down to the bottom of the water collection compartment 53. As mentioned before, condensed water is discharged when it reaches a certain level.

It should also be appreciated that the present invention is not limited to the embodiment disclosed herein. It can be anticipated that those having ordinary skills in the art can make various modification to the embodiments disclosed herein after learning the teaching of the present invention. For example, the number and arrangement of components in the system might be different, different elements might be used to achieve the same specific function. However, these modifications should be considered to fall into the protection scope of the invention as defined in the following claims.

What is claimed is:

1. A condenser, for cooling vapor contained in a gas flow, the condenser comprising:

a chamber having a generally circular cross-section about an axis thereof and adapted to be mounted with the axis substantially vertical;

a gas inlet opening into one end of the chamber, for supply of gas to one end of the chamber, and a gas outlet opening into the chamber, for discharge of gas from the chamber;

means for imparting a swirl component of velocity to the gas flow supplied to the chamber through the gas inlet and mounted adjacent said one end of the chamber, the arrangement being such that gas flows from one end of the chamber to the other end thereof; and means for cooling the chamber to thereby remove heat therefrom to promote condensation of the vapor;

wherein the means from imparting a swirl component of velocity to the gas flow comprises at least one of an arc-shaped gas compartment adjacent the gas inlet and a deflector vane.

2. A condenser as claimed in claim 1, which includes both the arc-shaped compartment and the deflector vane.

3. A condenser as claimed in claim 1, wherein the means for imparting a swirl component includes at least the arc-shaped gas compartment, and the condenser includes a casing and a head portion, together defining the chamber, wherein the gas inlet and the gas outlet and the arc-shaped chamber are provided in the head portion, the head portion being at said one end of the chamber.

4. A condenser as claimed in claim 2 or 3, wherein the means for imparting a swirl component includes the deflector vane, wherein the deflector vane is generally circular and includes a plurality of vanes extending radially out therefrom, the deflector vane being mounted on the axis of the chamber with the vanes extending to location close to the inside of the casing, the vanes being inclined to impart a swirl component of the gas flow passing therethrough.

5. A condenser as claimed in claim 1 or 3, wherein the head portion is provided at an upper end over chamber and wherein a separator is provided for separating condensed liquid from the gas.

6. A condenser as claimed in claim 5, wherein the separator comprises a generally cylindrical portion extending along the axis of the chamber from the other end thereof towards the one end thereof and including a bore in communication with the gas outlet, whereby the chamber is substantially annular and is defined between the casing and the separator, the separator including openings permitting gas to flow from the chamber into the bore thereof, for discharge through the gas outlet.

7. A condenser as claimed in claim 6, wherein the separator additionally includes a skirt portion at an end thereof adjacent said other end of the chamber, separating a water collection compartment from the chamber.

8. A condenser as claimed in claim 7, which includes a substantially annular cooling jacket around the exterior of the chamber.

9. A condenser as claimed in claim 8, wherein the cooling jacket includes at least one helical rib defining at least one helical channel extending through the cooling jacket.

10. A condenser as claimed in claim 9, wherein the cooling jacket includes an inlet for coolant adjacent the other end of the chamber and an outlet for coolant adjacent said one end of the chamber.

11. A condenser as claimed in claim 10, which includes the deflector vane, wherein the deflector vane is mounted on the separator and the separator is secured to the head portion.

12. A condenser as claimed in claim 11, which includes a water outlet for the water collection compartment and means for detecting the water level in the water collecting compartment, for controlling water level therein.

13. A condenser, for cooling vapor contained in a gas flow, the condenser comprising:

a chamber having a generally circular cross-section about an axis thereof and adapted to be mounted with the axis substantially vertical;

a gas inlet opening into one, upper end of the chamber, for supply of gas to one end of the chamber, and a gas outlet opening into the chamber, for discharge of gas from the chamber;

means for imparting a swirl component of velocity to the gas flow supplied to the chamber through the gas inlet and mounted adjacent said one end of the chamber, the arrangement such that gas flows from one end of the chamber to the other end thereof; and means for cooling the chamber to thereby remove heat therefrom to promote condensation of the vapor;

wherein the chamber provides for unobstructed downward movement of condensate towards the lower end thereof.

14. A condenser as claimed in claim 13, wherein the means from imparting a swirl component of velocity to the gas flow comprises at least one of an arc-shaped gas compartment adjacent the gas inlet and a deflector vane.

15. A condenser as claimed in claim 14, which includes both the arc-shaped compartment and the deflector vane, and wherein the condenser includes a casing and a head portion, together defining the chamber, wherein the gas inlet and the gas outlet and the arc-shaped chamber are provided in the head portion, the head portion being at said one end of the chamber.

16. A condenser as claimed in claim 13, wherein a separator is provided for separating condensed liquid from the gas.

17. A condenser as claimed in claim 16, wherein the chamber is defined by a casing, wherein the separator comprises a generally cylindrical portion extending along the axis of the chamber from the other end thereof towards the one end thereof and including a bore in communication with the gas outlet, wherein the chamber is substantially annular and unobstructed, and is defined between the casing and the separator, the separator including openings permitting gas to flow from the chamber into the bore thereof, for discharge through the gas outlet, whereby, in use the swirl component of velocity imparted to the gas promotes separation of water droplets towards the casing.

18. A condenser as claimed in claim 17, wherein the separator additionally includes a skirt portion at an end thereof adjacent said other end of the chamber, separating a water collection compartment from the chamber.

19. A condenser as claimed in claim 17, which includes a substantially annular cooling jacket around the exterior of the chamber.

20. A condenser as claimed in claim 19, wherein the cooling jacket includes at least one helical rib defining at least one helical channel extending through the cooling jacket.

21. A method of cooling a gas flow containing a vapor, to promote condensation of the vapor, the method comprising the steps of:

(1) supplying gas containing moisture to a chamber having a generally circular cross-section, applying a swirl component of a velocity to the gas flow and causing the gas to flow axially from one end of the chamber to the other with a helical path including the swirl component of flow;

(2) cooling the chamber to withdraw heat from the gas and promote condensation of the vapor;

(3) mounting the chamber substantially vertically, whereby condensed vapor runs vertically down the inside of the chamber;

(4) withdrawing gas, depleted in the vapor, along the axis of the chamber.

22. A method as claimed in claim 21, which includes withdrawing gas through a gas outlet provided at the one end of the chamber.

23. A method as claimed in claim 22, which further includes:

providing a separator including a bore, and in step (4) withdrawing gas along the bore from the other end of the chamber to the gas outlet.

24. A method as claimed in claim 23, which includes providing the separator with a plurality of through holes and passing gas through the through holes into the bore of the separator.

25. A method as claimed in claim 24, which includes imparting the swirl component of velocity to the gas flow by at least one of:

passing supplying the gas through an arc-shaped compartment; and passing the gas through a deflector vane.

26. A method as claimed in claim 25, including cooling the chamber by passing a coolant around the outside of the chamber countercurrent to direction of gas flow in the axial direction.

* * * * *